US012627898B2

(12) United States Patent (10) Patent No.: US 12,627,898 B2
Ueno (45) Date of Patent: May 12, 2026

(54) LOAD MANAGEMENT SYSTEM AND COIN ROLL PROCESSING APPARATUS

(71) Applicant: GLORY LTD., Himeji (JP)

(72) Inventor: Hitoshi Ueno, Hyogo (JP)

(73) Assignee: GLORY LTD., Hyogo (JP)

( * ) Notice: Subject to any disclaimer, the term of this patent is extended or adjusted under 35 U.S.C. 154(b) by 355 days.

(21) Appl. No.: 18/108,681

(22) Filed: Feb. 13, 2023

(65) Prior Publication Data

US 2023/0276138 A1 Aug. 31, 2023

(30) Foreign Application Priority Data

Feb. 25, 2022 (JP) ................................. 2022-027846

(51) Int. Cl.
*H04N 23/80* (2023.01)
*G07D 11/225* (2019.01)

(52) U.S. Cl.
CPC ........... *H04N 23/80* (2023.01); *G07D 11/225* (2019.01)

(58) Field of Classification Search
CPC ...... H04N 23/80; G07D 11/225; G07D 11/12; G07D 11/23; G07D 9/002
See application file for complete search history.

(56) References Cited

U.S. PATENT DOCUMENTS

| | | | |
|---|---|---|---|
| 10,467,843 B1* | 11/2019 | Moore | ................... G07D 11/34 |
| 2008/0230402 A1* | 9/2008 | Macor | ................. G06Q 30/018 |
| | | | 235/487 |
| 2010/0011428 A1* | 1/2010 | Atwood | ................. H04L 63/08 |
| | | | 709/227 |
| 2017/0140597 A1 | 5/2017 | Takami | |
| 2019/0392196 A1* | 12/2019 | Sagonas | ................ G06V 30/40 |
| 2021/0074101 A1 | 3/2021 | Pertz et al. | |

FOREIGN PATENT DOCUMENTS

| | | | | |
|---|---|---|---|---|
| JP | 2003-337969 | 11/2003 | | |
| JP | 2017-168059 | 9/2017 | | |
| JP | 2017168059 A | * 9/2017 | ............... G07D 9/00 | |

OTHER PUBLICATIONS

Extended European Search Report for European Patent Application No. 23155802.4 dated Jul. 14, 2023.

* cited by examiner

*Primary Examiner* — Yogesh K Aggarwal
(74) *Attorney, Agent, or Firm* — Amin, Turocy & Watson, LLP

(57) ABSTRACT

A load management system includes: an image acquisition sensor configured to acquire image data including an analysis target image including a load loaded in a medium processing apparatus; a judgment circuitry configured to judge whether or not the image data is authentic; and an image analysis circuitry configured to analyze the analysis target image to acquire information about the load when the image data is authentic.

8 Claims, 10 Drawing Sheets

LOAD MANAGEMENT SYSTEM AND COIN ROLL PROCESSING APPARATUS

CROSS REFERENCE TO RELATED APPLICATIONS

This application is entitled and claims the benefit of Japanese Patent Application No. 2022-027846, filed on Feb. 25, 2022, the disclosure of which including the specification, drawings and abstract is incorporated herein by reference in its entirety.

TECHNICAL FIELD

The present disclosure relates to a load management system and a coin roll processing apparatus.

BACKGROUND ART

A variety of media, such as money (coin rolls, loose coins, banknotes, and the like), checks, and the like are processed by a medium processing apparatus. For proper processing and management of a medium, the medium to be processed or a container storing the medium to be processed needs to be properly loaded into the medium processing apparatus. Patent Literature (hereinafter, referred to as "PTL") 1 discloses a coin roll handling apparatus that is one example of a medium processing apparatus. The coin roll handling apparatus comprises an image reading section. Based on an image acquired by the image reading section, the type and number of coin rolls loaded can be obtained, and the coin roll handling apparatus manages the coin rolls based on results obtained.

CITATION LIST

Patent Literature

PTL 1
Japanese Patent Application Laid-Open No. 2003-337969

SUMMARY

Technical Problem

When the medium processing apparatus comprises an image-capturing apparatus, the structure of the medium processing apparatus becomes complicated and the size of the medium processing apparatus increases. In addition, it is generally difficult to later attach the image-capturing apparatus to the medium processing apparatus that is already in operation.

An object of the present disclosure is to manage a load loaded in a medium processing apparatus without complicating the structure of the medium processing apparatus.

Solution to Problem

A load management system according to the present disclosure comprises: an image acquisition sensor configured to acquire image data including an analysis target image including a load loaded in a medium processing apparatus; a judgment circuitry configured to judge whether or not the image data is authentic; and an image analysis circuitry configured to analyze the analysis target image to acquire information about the load when the image data is authentic.

The medium processing apparatus has an apparatus identifier that allows the medium processing apparatus to be recognized and whose image is capable of being captured, and the judgment section may judge whether or not the image data is authentic, based on identifier information acquired from the image of the apparatus identifier included in the analysis target image.

The load management system according to the present disclosure may further comprise a token issuance circuitry configured to issue a token to an image-capturing apparatus configured to capture the analysis target image, in which based on whether or not the token is added to the image data, the judgment section may judge whether or not the image data is authentic.

The token issuance section may issue, as the token, a token necessary for the image-capturing apparatus to enable an image-capturing function.

The token issuance section may issue, as the token, a token having an expiration period.

The load management system according to the present disclosure may further comprise a communication circuitry configured to establish a communication session with an image-capturing apparatus through a wired connection or short-range wireless communication, the image-capturing apparatus being configured to capture the analysis target image, in which based on whether or not the image acquisition section has acquired the image data during the communication session established, the judgment section may judge whether or not the image data is authentic.

The image data may be provided with a time stamp, and the time stamp is issued by a time stamp issuing server and certifies time at which the analysis target image is captured by an image-capturing apparatus, and based on the time stamp, the judgment section may judge whether or not the image data is authentic.

The load management system according to the present disclosure may further comprise the image-capturing apparatus.

The load management system according to the present disclosure may further comprise a memory configured to store the information.

When the judgment section judges that the image data is not authentic, the image analysis section analyzes the analysis target image to generate temporary information about the load, and the memory section stores the temporary information in association with a flag indicating that the image data is not authentic. The image analysis section operates based on various image analysis programs.

The load management system according to the present disclosure may further comprise a coin roll processing apparatus as the medium processing apparatus, in which: the load is a coin roll, and the information is information about a type and a number of the coin roll.

The medium processing apparatus may comprise at least one storage section in which the coin roll is stored, and an openable and closable transparent cover covering an opening in the storage section, and the analysis target image may include the coin roll that is visually recognized via the cover and is stored in the storage section.

The medium processing apparatus may comprise a sensor configured to detect a change in an open or closed state of the cover, and when the sensor detects that the cover is opened after time when the analysis target image is captured, the judgment section may judge that the image data is not authentic.

The analysis target image may include the coin roll that is stored in a plurality of the storage sections and is visually recognized via a plurality of the covers.

The load management system according to the present disclosure may further comprise a money processing apparatus as the medium processing apparatus, in which: the load is a cassette for storing money, and the cassette may have a cassette identifier that allows the cassette to be recognized and whose image is capable of being captured.

The coin roll processing apparatus according to the present disclosure may comprise: a storage in which a coin roll is stored; an openable and closable transparent cover covering an opening in the storage section; and an identifier displayed at a position where an image of the identifier is capable of being captured together with the coin roll stored in the storage section and whose image is capable of being captured via the cover.

The coin roll processing apparatus according to the present disclosure may further comprise a sensor configured to detect a change in an open or closed state of the cover.

Advantageous Effects of Invention

According to the present disclosure, it is possible to manage the load loaded in the medium processing apparatus without complicating the structure of the medium processing apparatus.

DESCRIPTION OF EMBODIMENTS

Hereinafter, embodiments of the present disclosure will be described in detail with reference to the drawings.

Embodiment 1

Figures 1, 2:
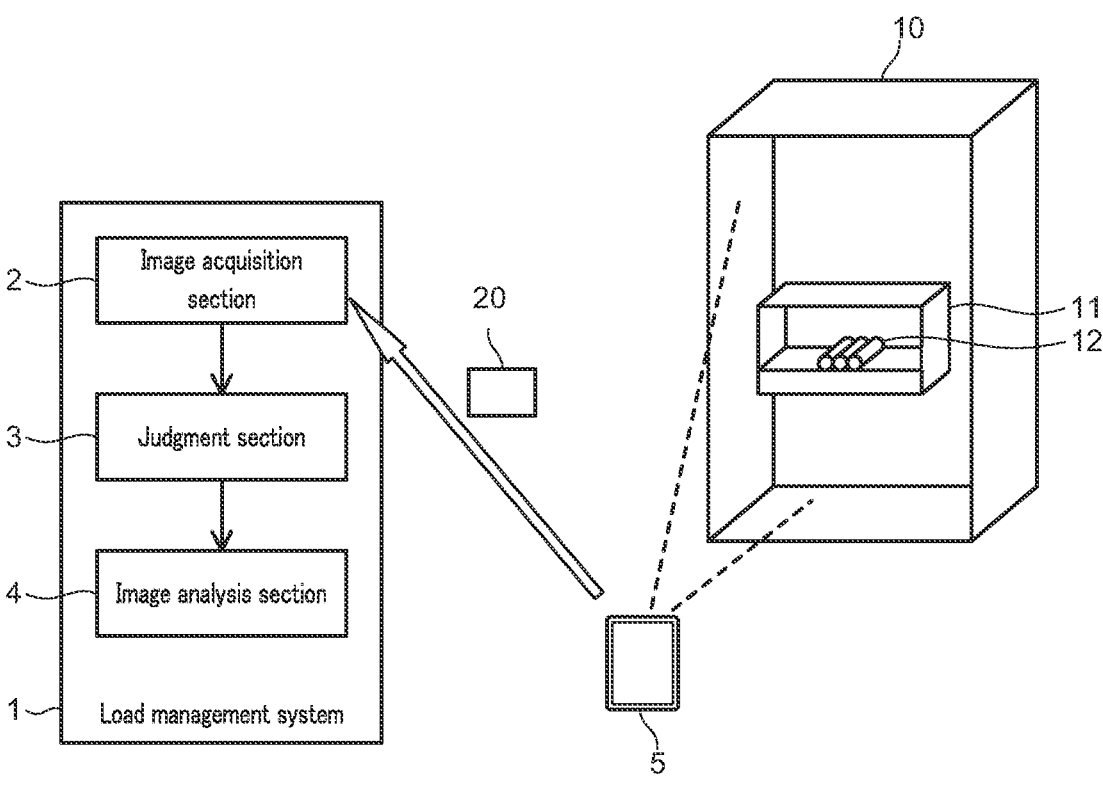
FIG. 1 schematically illustrates a load management system according to Embodiment 1.
FIG. 2 is a block diagram of image data in Embodiment 1.

FIG. 1 schematically illustrates a load management system 1 according to Embodiment 1. FIG. 2 is a block diagram conceptually illustrating image data 20 according to Embodiment 1. The load management system 1 comprises an image acquisition section 2, a judgment section 3, and an image analysis section 4. The load management system 1 cooperates with an image-capturing apparatus 5 to manage loads loaded in a medium processing apparatus 10. Note that the load management system 1 may comprise the image-capturing apparatus 5, the medium processing apparatus 10, or both of them as its components.

The load management system 1 may be configured in a single computer or may be configured distributedly in a plurality of computers. When the load management system 1 is distributed in a plurality of computers, the load management system 1 may be comprised of a plurality of servers.

The image acquisition section 2 is an interface configured to be capable of acquiring information from the outside, and is capable of being comprised of, for example, a LAN adaptor and a LAN driver. The image acquisition section 2 may be comprised of a wireless communication adaptor that performs short-range wireless communication of a standard such as Bluetooth.

The judgment section 3 is comprised of a processor that executes a judgment program stored in a memory. The judgment program may have an image analysis function.

The image analysis section 4 is comprised of a processor that executes an image analysis program stored in a memory.

One computer or one of a plurality of computers constituting the load management system 1 may also serve as a control apparatus of the medium processing apparatus 10, or may also be a so-called host apparatus connected to the medium processing apparatus 10 and used for manipulation of the medium processing apparatus 10.

In the present embodiment, the medium processing apparatus 10 is a coin roll processing apparatus. The medium processing apparatus 10 comprises a stacker 11. The stacker 11 stores coin rolls 12. Each of the coin rolls 12 is a medium to be processed by the medium processing apparatus 10, and is a load to be loaded in advance into the medium processing apparatus 10 prior to the processing and managed by the load management system 1. The coin roll 12 is composed of a plurality of coins stacked in a columnar shape. The coin roll 12 may be wrapped in a sheet of plastic film, paper, or the like. The stacker 11 is a tray-shaped member for storing a plurality of coin rolls 12. The stacker 11 stores the coin rolls 12, with the bottom surfaces of the coin rolls 12 (i.e., the faces or the backs of the coins) facing sideways. The coin rolls 12 are stored in the stacker 11 manually.

The image-capturing apparatus 5 is an apparatus used to capture an image of the coin roll 12 loaded in the medium processing apparatus 10 (that is, stored in the stacker 11). The image-capturing apparatus 5 is, for example, a tablet computer, a smartphone, or a digital camera. The image-capturing apparatus 5 may be a security camera located at an installation location where the medium processing apparatus 10 is installed.

When the image of the coin roll 12 is captured, the image-capturing apparatus 5 generates image data 20 that is electronic data, and transmits the image data to the image acquisition section 2. The image data 20 includes an analysis target image 21 and auxiliary data 22. The analysis target image 21 is an image itself generated by image capturing. The auxiliary data 22 is data other than the analysis target image 21, and may include, for example, information such as an image-capturing time by the image-capturing apparatus 5, a recognition ID of the image-capturing apparatus 5, or a recognition ID of a user of the image-capturing apparatus 5 (that is, a person who captures an image). Depending on a processing mode for processing the image data 20, the content of the auxiliary data 22 may be appropriate content. The analysis target image 21 may be a body part of the image data 20, and the auxiliary data 22 may be a header part of the image data 20.

The image acquisition section 2 acquires the image data 20 directly from the image-capturing apparatus 5 or via a LAN or a network such as the Internet.

When the image data 20 is acquired by the image acquisition section 2, the judgment section 3 starts judgment. The judgment section 3 judges whether or not the image data 20 is authentic. The expression, "the image data 20 is authentic," means that at least one of the timing (that is, the date and time) at which the image capturing is performed, the image-capturing target, and the image-capturing apparatus is appropriate. When the image data 20 is authentic, it is possible to determine (in other words, to trust) that the information on the load acquired by analyzing the analysis target image 21 appropriately reflects the actual condition at the time point of judgment. When two or more conditions from among the image-capturing timing, the image-capturing target, and the image-capturing apparatus are appropriate, it can be more reliably said that the image data 20 is authentic. Note that the expression, "the image data 20 is authentic," can be replaced with the expression, "the analysis target image 21 is authentic." The judgment section 3 determines that the image data 20 is an authentic image when at least one condition from among the image-capturing timing, the image-capturing target, and the image-capturing apparatus is appropriate.

For example, when a difference between the image-capturing time included in the auxiliary data 22 and the current time at which the judgment is performed is equal to or less than a predetermined value, the judgment section 3 can judge that the timing at which the image capturing is performed is appropriate.

The expression, "the image-capturing target is appropriate," means that the image-capturing target is the coin roll 12 loaded in the medium processing apparatus 10. The expression, "the image-capturing target is the coin roll 12 loaded in the medium processing apparatus 10," means that the image-capturing target is none of (1) a coin roll 12 that is not loaded anywhere, (2) a coin roll 12 that is loaded in a location other than the medium processing apparatus 10 (e.g., another medium processing apparatus), and (3) anything other than the coin roll 12.

For example, when information indicating an image-capturing location that is included in the image data 20 matches the installation location of the medium processing apparatus 10, the judgment section 3 may judge that the image-capturing target is the coin roll 12 loaded in the medium processing apparatus 10. Note that the information indicating the image-capturing location can be obtained, for example, by receiving a beacon signal by the image-capturing apparatus 5 from a transmitter installed in the vicinity of the medium processing apparatus 10 or by positioning the image-capturing apparatus 5 by GPS. The image-capturing apparatus 5 includes the obtained information on the image-capturing location (which may be referred to as "image-capturing location information") in the image data 20. Further, the information indicating the image-capturing location may be a mark appearing in the analysis target image 21, (for example, an external appearance (e.g., a shape or a pattern) of a characteristic object disposed behind the medium processing apparatus 10), or a characteristic external appearance (e.g., a shape or a pattern) of the medium processing apparatus 10 itself. In this case, the judgment section 3 is capable of performing image analysis on the analysis target image 21 and judging whether or not the image-capturing target is the coin roll 12 loaded in the medium processing apparatus 10, based on whether or not the mark appears in the analysis target image 21. In addition, in place of the judgment by the judgment section 3 using the image-capturing location information of the medium processing apparatus 10 as described above, the judgment by the judgment section 3 using specific information (for example, an apparatus ID) of the image-capturing apparatus can also be performed, which will be described in detail in Embodiment 2.

For example, when the recognition ID of the image-capturing apparatus 5 included in the auxiliary data 22 matches the recognition ID registered in advance, the judgment section 3 can determine that the image-capturing apparatus is appropriate.

When the judgment section 3 judges that the image data 20 is authentic, the image analysis section 4 analyzes the analysis target image 21 to acquire information on the load, that is, the coin roll 12. Specifically, the image analysis section 4 acquires the type of coins (at least one of the currency and the face value) constituting the coin roll 12 and the number of coin rolls 12 for each type of coins by performing the image analysis. Since the judgment section 3 has already judged that the image data 20 is authentic, it is possible to trust the number of coin rolls 12 for each type of coins acquired in the image analysis, and that an apparatus in which the coin rolls 12 are loaded is the medium processing apparatus 10 in which the coin rolls 12 are to be loaded, and is not other apparatuses than the medium processing apparatus 10. Therefore, the load management system 1 is capable of accurately acquiring and managing the type and the number of coin rolls 12 loaded in the medium processing apparatus 10. Further, an operator or the like who loads the coin rolls 12 is allowed to omit an operation of inputting the type and number of coin rolls 12 loaded, and it is possible to prevent the occurrence of an input error.

Note that the image-capturing apparatus 5 may access a time stamp issuing server via a network when capturing the image of the coin roll 12, and may receive a time stamp that certifies the time at which the analysis target image 21 is captured by the image-capturing apparatus 5 (that is, a time stamp that indicates the time at which the analysis target image 21 is present). In this case, the image-capturing apparatus 5 includes the received time stamp in the auxiliary data 22. When a difference between the time indicated by the time stamp and the current time at which the judgment is performed is equal to or less than a predetermined value, the judgment section 3 may judge that the timing at which the image capturing is performed is appropriate.

Embodiment 2

Figures 3, 4:
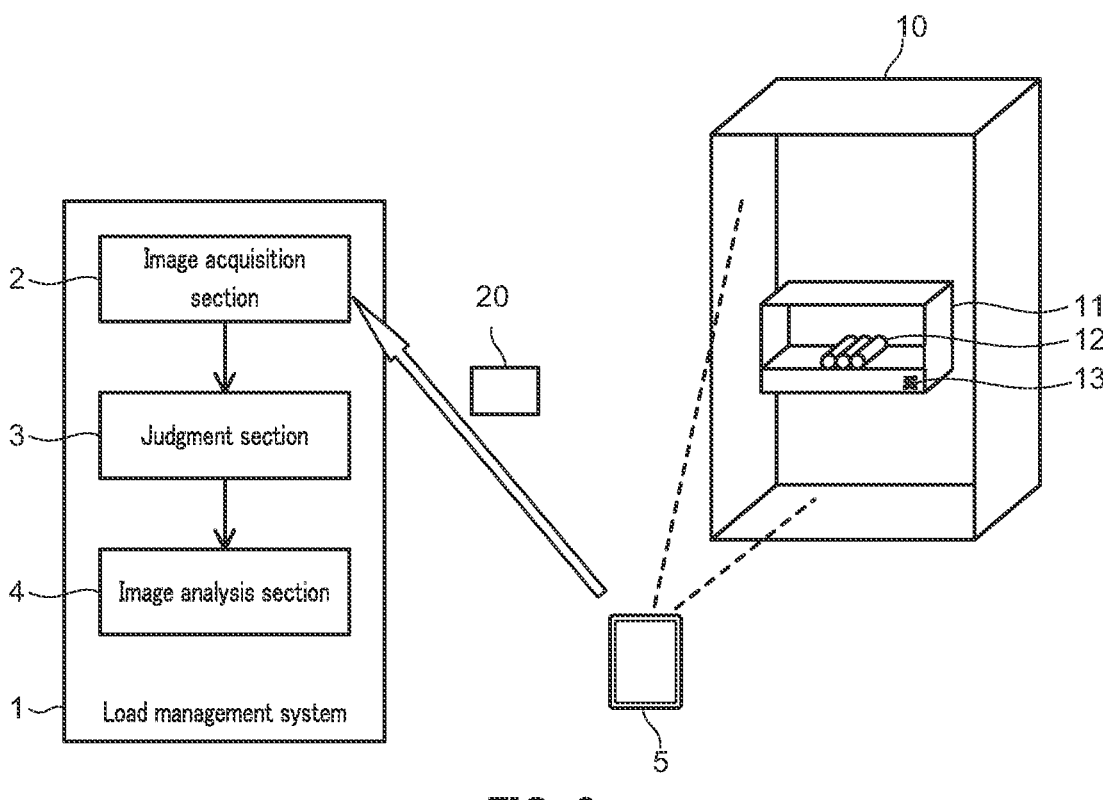
FIG. 3 schematically illustrates a load management system according to Embodiment 2.
FIG. 4 is a block diagram of image data in Embodiment 2.

FIG. 3 schematically illustrates a load management system 1 according to Embodiment 2. FIG. 4 is a block diagram conceptually illustrating image data 20 according to Embodiment 2. Description of the same features as those in Embodiment 1 will be omitted.

In the present embodiment, it is assumed that the medium processing apparatus 10 has an apparatus identifier 13. The apparatus identifier 13 is an identifier that is specific to the medium processing apparatus 10 and in which information specific to the medium processing apparatus 10 is embedded. The medium processing apparatus 10 may be recognized based on the information specific to the medium processing apparatus 10. The apparatus identifier 13 is, for example, a two-dimensional barcode. The apparatus identifier 13 is disposed at a position where an image of the apparatus identifier 13 together with the loaded coin roll 12 can be captured by the image-capturing apparatus 5. For example, the apparatus identifier 13 is disposed on an outer surface of the stacker 11 or on a housing of the medium processing apparatus 10.

The judgment section 3 analyzes the analysis target image 21, judges whether or not the analysis target image 21 includes the apparatus identifier 13, and acquires the identifier information from the apparatus identifier 13 when the analysis target image is included. The identifier information indicates that the apparatus to which the apparatus identifier 13 is attached is the medium processing apparatus 10. When the identifier information specific to the medium processing apparatus 10 can be read from the apparatus identifier 13 in the analysis target image 21, the judgment section 3 judges that the image-capturing target is appropriate.

Embodiment 3

Figure 5:
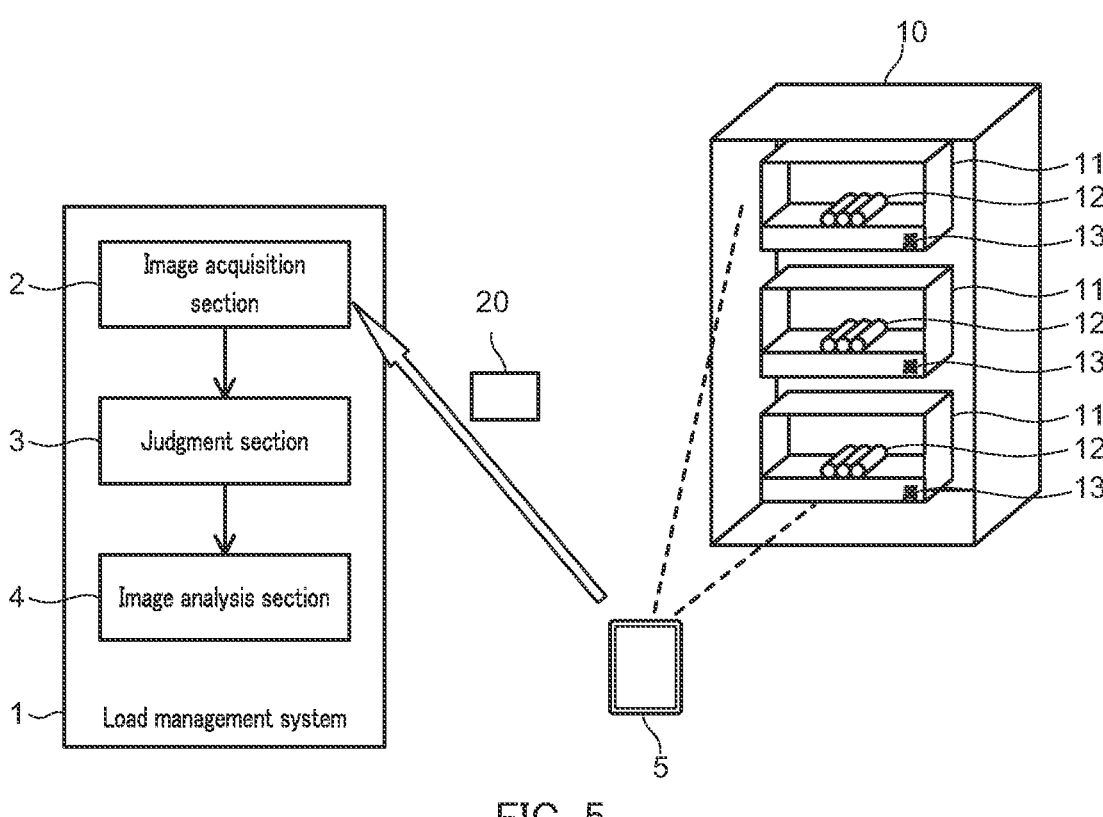
FIG. 5 schematically illustrates a load management system according to Embodiment 3.
Figure 6:
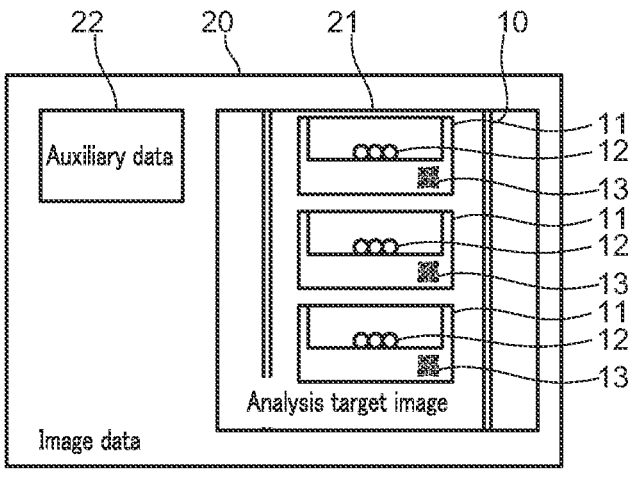
FIG. 6 is a block diagram of image data in Embodiment 3.

FIG. 5 schematically illustrates a load management system 1 according to Embodiment 3. FIG. 6 is a block diagram conceptually illustrating image data 20 according to Embodiment 3. Description of features the same as those in Embodiment 1 or Embodiment 2 will be omitted.

In the present embodiment, it is assumed that the medium processing apparatus 10 in which the coin roll 12 to be managed is loaded comprises a plurality of stackers 11, and each of the stackers 11 has the apparatus identifier 13. The apparatus identifier 13 is an identifier that is specific to the stacker 11 and in which information specific to the stacker 11 is embedded. The stacker 11 may be recognized based on the information specific to the stacker 11. That is, based on the information embedded in the apparatus identifier 13, it is possible to know which medium processing apparatus 10 the stacker 11 with the apparatus identifier 13 belongs to and which tier the stacker 11 is on.

The judgment section 3 analyzes the analysis target image 21, judges whether or not one or more apparatus identifiers 13 are included in the analysis target image 21, and acquires identifier information from the one or more apparatus identifiers 13 when the one or more apparatus identifiers 13 are included. The identifier information acquired from any of the apparatus identifiers 13 indicates that the stacker 11 with the apparatus identifier 13 is the stacker 11 attached to the medium processing apparatus 10. The judgment section 3 judges that the image-capturing target is appropriate, when the identifier information specific to the stacker 11 attached to the medium processing apparatus 10 can be acquired from the one or more apparatus identifiers 13 in the analysis target image 21. In Embodiment 3, the judgment by the judgment section 3 is basically performed using a single image in which all the stackers 11 and all the apparatus identifiers 13 are included. Depending on image-capturing situations, the judgment by the judgment section 3 may be performed using a single image in which a part of all the stackers 11 and a part of all the apparatus identifiers 13 are included.

Subsequently, the image analysis section 4 analyzes the analysis target image 21 to acquire information on coin rolls 12 stored in each stacker 11. That is, for each stacker 11, the types of coins constituting the coin rolls 12 stored in the stacker 11 and the numbers of coin rolls 12 for each type of coins are acquired. Therefore, by one image capturing by the image-capturing apparatus 5 for each stacker 11 storing the coin rolls 12, the load management system 1 according to the present embodiment is capable of accurately acquiring and managing the types and numbers of coin rolls 12 loaded in the medium processing apparatus 10. In Embodiment 3, the image analysis by the image analysis section 4 is performed basically using a single image in which all the stackers 11 and all the apparatus identifiers 13 are included. The image analysis may be performed using a single image in which a part of all the stackers 11 and a part of all the apparatus identifiers 13 are included. In this case, the image analysis is performed using a plurality of images covering all the stackers 11 and all the apparatus identifiers 13.

Embodiment 4

Figure 7:
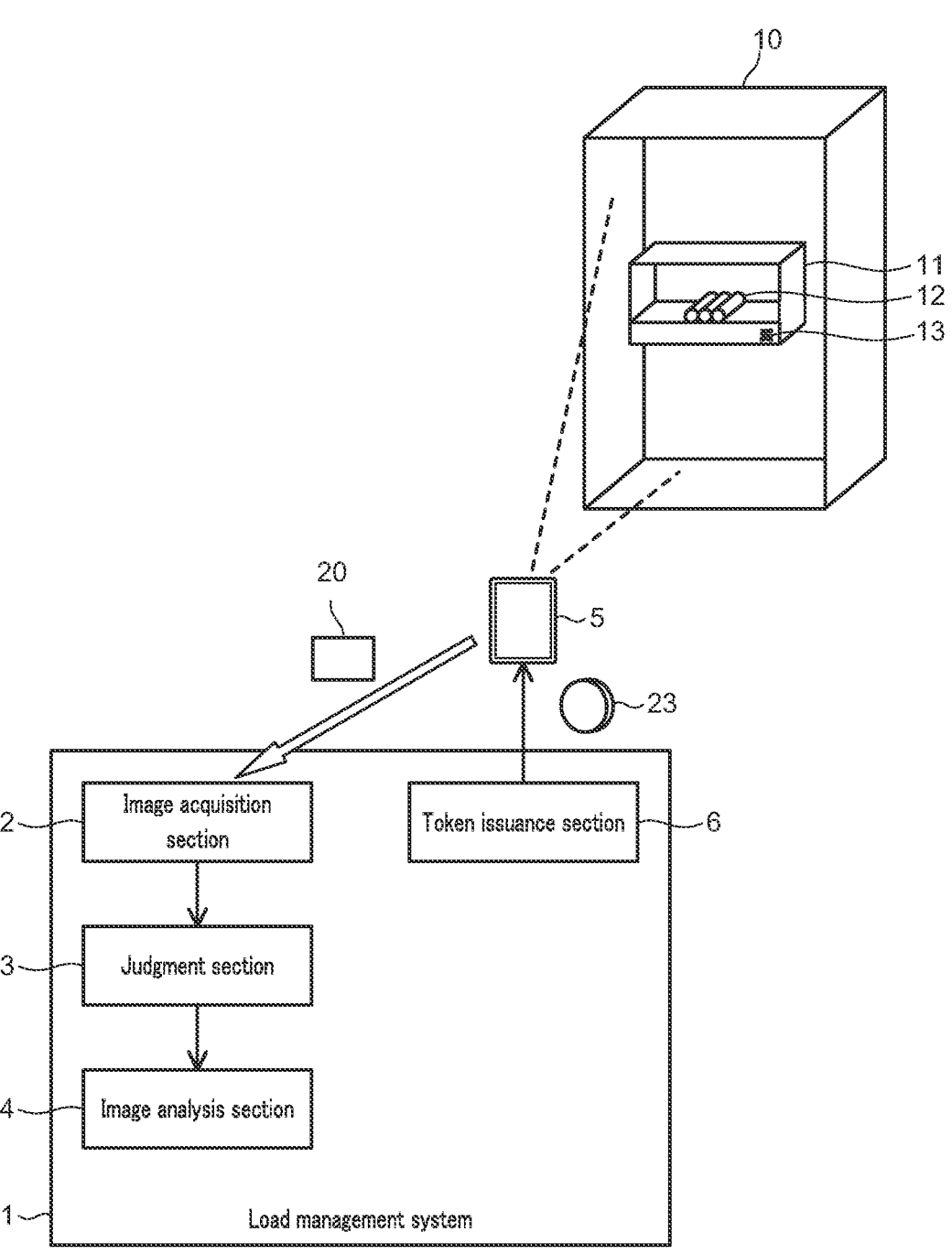
FIG. 7 schematically illustrates a load management system according to Embodiment 4.
Figure 8:
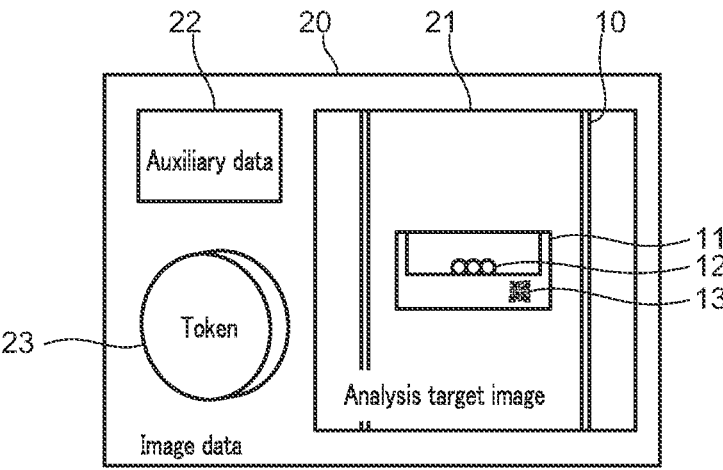
FIG. 8 is a block diagram of image data in Embodiment 4.

FIG. 7 schematically illustrates a load management system 1 according to Embodiment 4. FIG. 8 is a block diagram conceptually illustrating image data 20 according to Embodiment 4. Descriptions of features the same as those in the above-described embodiments will be omitted.

The load management system 1 according to the present embodiment comprises a token issuance section 6. The token issuance section 6 may be configured in a computer different from a computer in which the image acquisition section 2, the judgment section 3, and the image analysis section 4 are configured, or may be configured in a computer in which one or more of the image acquisition section 2, the judgment section 3, and the image analysis section 4 are configured.

The token issuance section 6 is comprised of a processor that executes a token issuance program stored in a memory.

The token issuance section 6 generates a token 23 that is electronic data, and transmits the token to the image-capturing apparatus 5. That is, the token issuance section 6 issues the token 23 to the image-capturing apparatus 5. The issuance of the token 23 may be issuance performed in accordance with an issuance request made by manipulation of the image-capturing apparatus 5 by a user of the image-capturing apparatus 5, or may be issuance in accordance with an issuance request by a user of the load management system. Alternatively, the medium processing apparatus 10 may be configured to transmit a loading completion signal when detecting that a load has been loaded, and the token 23 may be issued when the token issuance section 6 receives the loading completion signal.

After receiving the token 23, the image-capturing apparatus 5 captures an image of the load (in the case of the present embodiment, the coin rolls 12), generates the image data to which the token 23 is added, and transmits the image data to the image acquisition section 2.

The judgment section 3 judges whether or not the image data 20 is authentic, based on whether or not the token 23 issued by the token issuance section 6 is added to the image data 20. That is, on condition that the token 23 is added, the judgment section 3 judges that the image data 20 is authentic.

The judgment section 3 may obtain, from the token issuance section 6, issuance time of the token 23 included in the acquired image data 20. In this case, on condition that a difference between the issuance time of the token 23 and the current time at which the judgment is performed is equal to or less than a predetermined value, the judgment section 3 can judge that the timing at which the image capturing is performed is appropriate.

An expiration period may be set in the token 23. In this case, the judgment section 3 can judge that the timing at which the image capturing is performed is appropriate, on condition that the token 23 included in the acquired image data 20 is valid at the time of the judgment.

The token 23 may include information for enabling the image-capturing function of the image-capturing apparatus 5. That is, the token 23 may be information that gives image-capturing authority to the image-capturing apparatus 5. In this case, the image-capturing apparatus 5 is not capable of capturing an image of the load unless the token 23 is received. Therefore, it is possible to capture an image using any image-capturing apparatus 5. For example, it becomes possible to use an image-capturing apparatus 5 possessed by a clerk of the bank in which the medium processing apparatus 10 is installed, and an image-capturing apparatus 5 possessed by an operator of a cash-in-transit company who loads the coin rolls 12 into the medium processing apparatus 10. Therefore, introduction and operation of the load management system 1 are facilitated. In this case, since the token 23 is added to the image data 20, it is also possible to judge that the image-capturing apparatus is appropriate.

Embodiment 5

Figure 9:
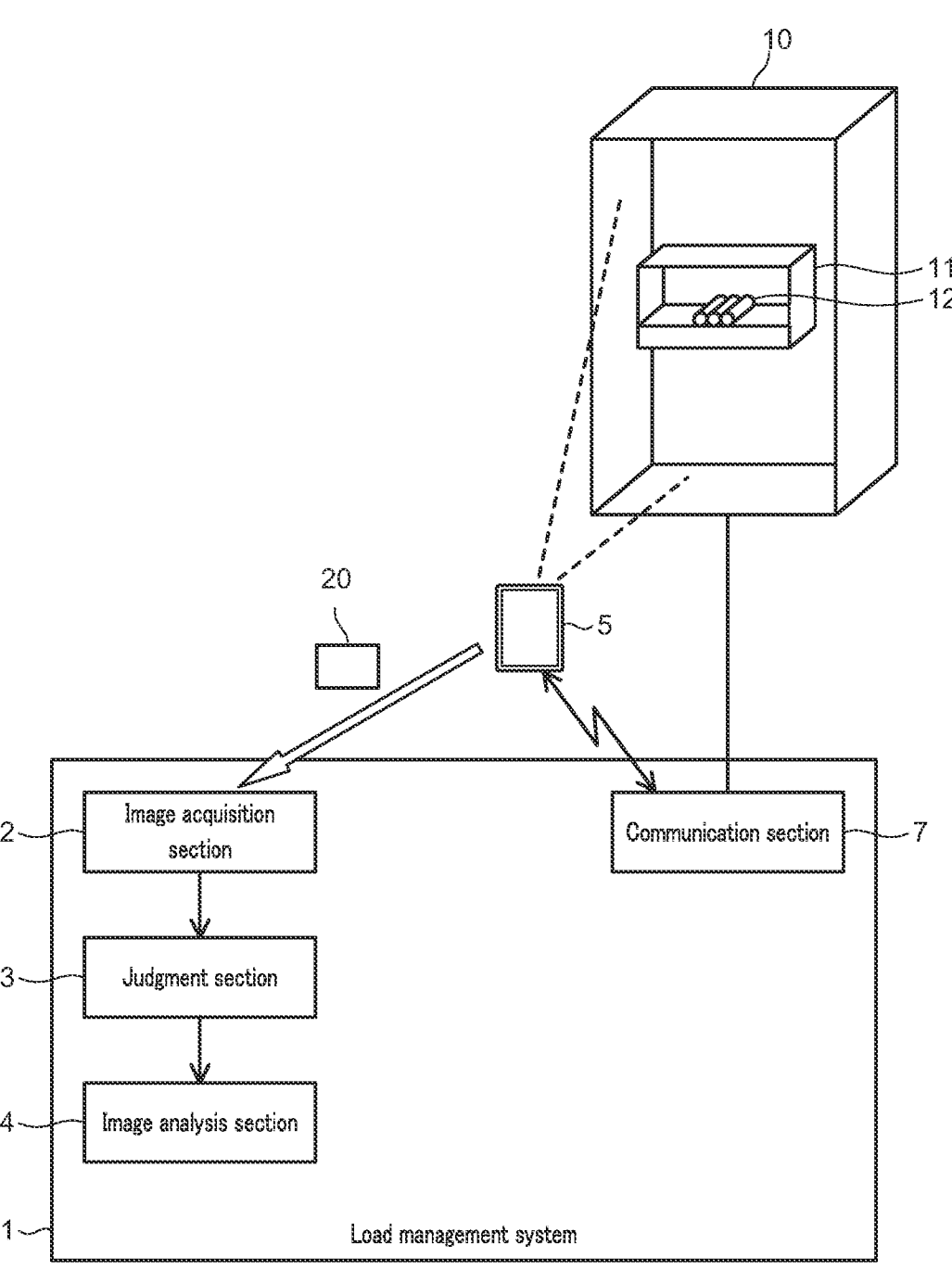
FIG. 9 schematically illustrates a load management system according to Embodiment 5.
Figure 10:
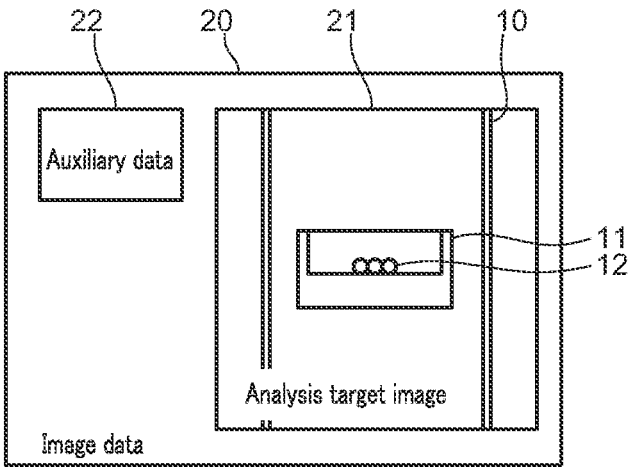
FIG. 10 is a block diagram of image data in Embodiment 5.

FIG. 9 schematically illustrates a load management system 1 according to Embodiment 5. FIG. 10 is a block diagram conceptually illustrating image data 20 according to Embodiment 5. Descriptions of features the same as those in the above-described embodiments will be omitted.

The load management system 1 according to the present embodiment comprises a communication section 7. The communication section 7 may be configured in a computer different from a computer in which the image acquisition section 2, the judgment section 3, and the image analysis section 4 are configured, or may be configured in a computer in which one or more of the image acquisition section 2, the judgment section 3, and the image analysis section 4 are configured.

Note that, the communication section 7 is configured in a control apparatus of the medium processing apparatus 10 or a so-called host apparatus which is disposed in the vicinity of the medium processing apparatus 10 and is connected to the medium processing apparatus 10 to be used for the operation of the medium processing apparatus 10.

The communication section 7 is communicatively connected to the image-capturing apparatus 5 existing near the communication section 7. For example, the communication section 7 is physically connected to the image-capturing apparatus 5. That is, the communication section 7 is connected to the image-capturing apparatus 5 by a wire or by connection between a connector comprised by the medium processing apparatus 10 or the host apparatus and a connector comprised by the image-capturing apparatus 5. Alternatively, the communication section 7 is connected to the image-capturing apparatus 5 by short-range wireless communication.

Therefore, only while the image-capturing apparatus 5 is present in the vicinity of the communication section 7 (that is, the medium processing apparatus 10), the image-capturing apparatus 5 can establish a communication session with the communication section 7 for which security is secured. Therefore, when the image acquisition section 2 acquires the image data 20 from the image-capturing apparatus 5 during the communication session established between the communication section 7 and the image-capturing apparatus 5, the judgment section 3 can judge that the image data 20 is authentic. In this case, the image data 20 is acquired from the image-capturing apparatus 5 situated near the medium processing apparatus 10 and remaining communicatively connected with the medium processing apparatus 10. Therefore, the judgment section 3 can judge that the timing at which the image-capturing is performed, the image-capturing target, and the image-capturing apparatus 5 are appropriate. In the load management system 1 according to the present embodiment, the apparatus identifier 13 is attached to the medium processing apparatus 10, and it is needless to say that the apparatus identifier may be used for judgment in the same manner as in the other embodiments.

(Exemplary Configuration of Medium Processing Apparatus)

Figure 11:
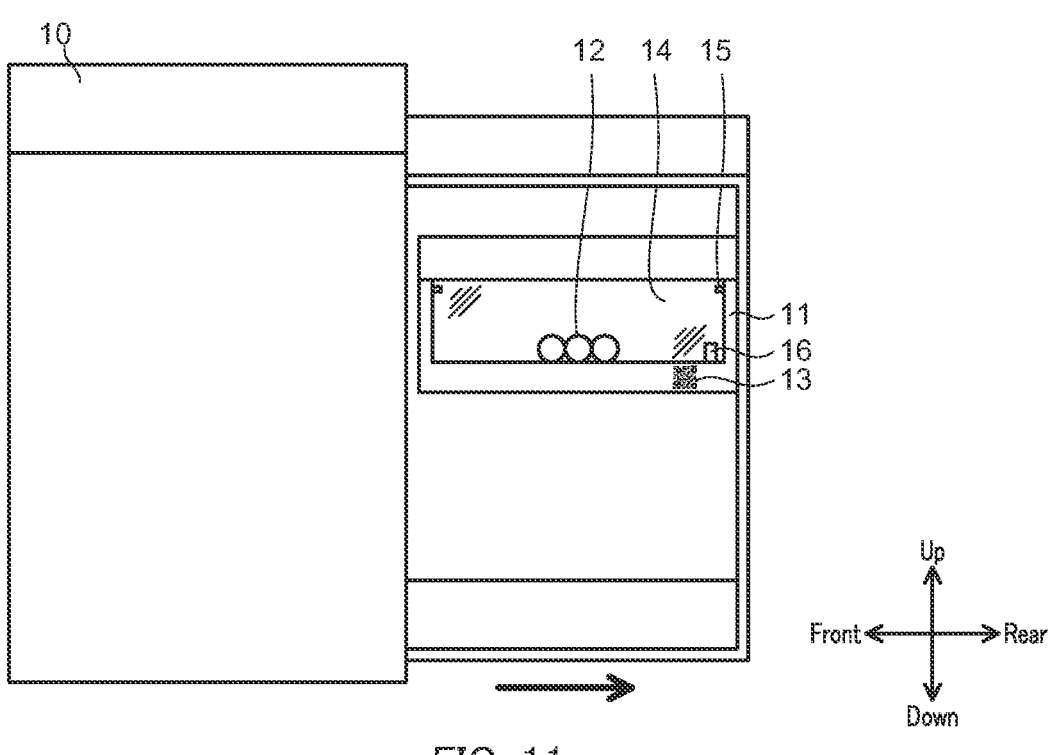
FIG. 11 is a perspective view illustrating one exemplary configuration of the medium processing apparatus.

FIG. 11 is a perspective view illustrating one exemplary configuration of the medium processing apparatus 10. The medium processing apparatus 10 is configured such that the stacker 11 (an internal unit including the stacker) disposed inside the medium processing apparatus 10 can be pulled out to one direction side, for example, a rear side. FIG. 11 illustrates a state in which the stacker 11 is pulled out to the rear side. The arrow in FIG. 11 indicates the pull-out direction. The front side of the medium processing apparatus 10 is a side where an outlet (not illustrated) for dispensing the coin roll 12 by the medium processing apparatus 10 is formed, and the rear side is a side opposite to the front side. Further, the lower side of the medium processing apparatus 10 is a side close to the surface on which the medium processing apparatus 10 is installed, and the upper side is a side opposite to the lower side. The right side and the left side of the medium processing apparatus 10 are the right side and the left side of the medium processing apparatus 10 as seen from the front side. That is, FIG. 11 is a perspective view of the medium processing apparatus 10 seen from the upper right.

An opening through which the coin roll 12 passes when the coin roll 12 is stored is formed in the side surface of the stacker 11, for example, in the right side surface. A cover 14 made of a transparent material is attached to the stacker 11 so as to cover the opening. The cover 14 may be formed of, for example, resin or glass. The cover 14 may be attached to the stacker 11 in any manner as long as the cover can be opened and closed. For example, the cover may be attached via a hinge 15.

When the coin roll 12 is loaded into the medium processing apparatus 10 configured as described above, the coin roll 12 stored in the stacker 11 is visually recognized from the outside via the cover 14. Therefore, when the medium processing apparatus 10 configured as described above is used together with the load management system 1, the image-capturing apparatus 5 can capture an image of the coin roll 12 loaded in the medium processing apparatus 10. When the medium processing apparatus 10 has the apparatus identifier 13, the coin roll 12 loaded in the medium processing apparatus 10 and the apparatus identifier 13 can be included in a single image (that is, the analysis target image 21).

Further, a sensor 16 for detecting a change in the open or closed state of the cover 14 may be attached to the stacker 11, and the judgment section 3 may be configured to be capable of acquiring a detection result of the sensor 16. In this case, when the sensor 16 detects that the cover 14 is opened after the time at which the analysis target image 21 is captured, the judgment section 3 may judge that the image data 20 is not authentic. For example, when the cover 14 is opened and the coin roll 12 is taken out from the stacker 11 after the image is captured, the analysis target image 21 that has arrived at the load management system 1 should show a state in which the loaded coin rolls 12 are more than the actual number at that time. When information is acquired from such an analysis target image 21, the number of coin rolls 12 cannot be appropriately managed. However, when the judgment section 3 uses the detection result of the sensor 16 for the judgment, it is possible to prevent inappropriate management due to a change in the state of the coin rolls 12 loaded in the medium processing apparatus 10 after the analysis target image 21 is captured.

Figure 12:
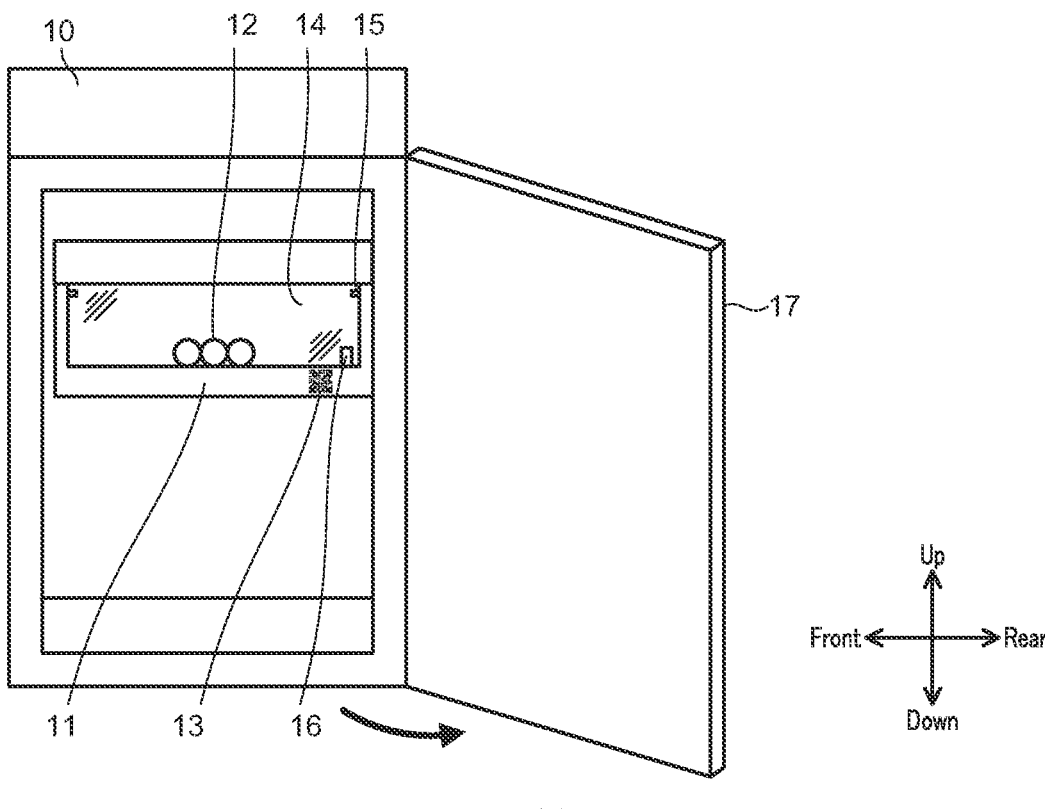
FIG. 12 is a perspective view illustrating another exemplary configuration of the medium processing apparatus.

The medium processing apparatus 10 may be configured as illustrated in FIG. 12. That is, the medium processing apparatus 10 may comprise a door 17 allowing a side surface (a right side surface in the case of FIG. 12) of the medium processing apparatus 10 to be opened and closed. The arrow in FIG. 12 indicates the opening direction. In this case, when the door 17 is opened, the image-capturing apparatus 5 can take the image of the coin rolls 12 loaded in the medium processing apparatus 10.

Although only one stacker 11 is illustrated in FIGS. 11 and 12, the medium processing apparatus 10 may comprise a plurality of stackers 11, each of which comprises the cover 14. In other words, the load management system 1 according to Embodiment 3 illustrated in FIG. 5 may be used together with the medium processing apparatus 10 comprising a plurality of stackers 11, each of which comprises the cover 14. In addition, the medium processing apparatus 10 may comprise a plurality of stackers 11, each of which comprises the cover 14 and the sensor 16. In other words, the load management system 1 according to Embodiment 3 illustrated in FIG. 5 may be used together with the medium processing apparatus 10 comprising a plurality of stackers 11, each of which comprises the cover 14 and the sensor 16.

When the medium processing apparatus 10 used in conjunction with Embodiment 4 illustrated in FIG. 7 comprises the cover 14 and the sensor 16, the medium processing apparatus 10 may transmit a loading completion signal to the token issuance section 6 on the occasion when the sensor 16 detects closure of the cover 14.

Embodiment 6

Figure 13:
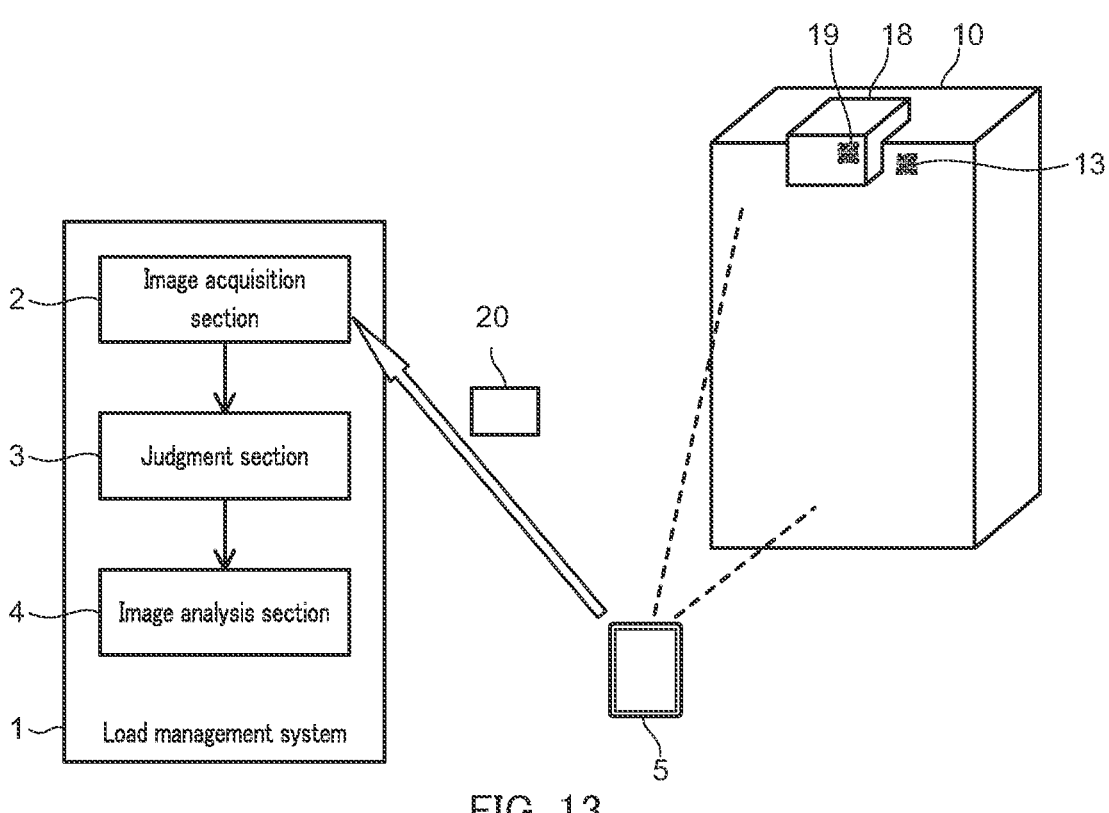
FIG. 13 schematically illustrates a load management system according to Embodiment 6.
Figure 14:
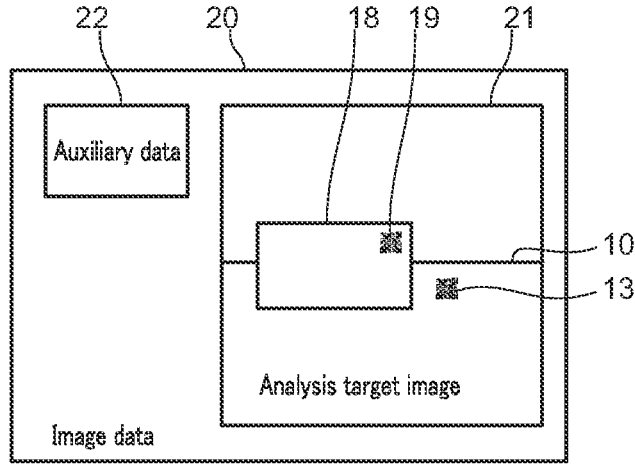
FIG. 14 is a block diagram of image data in Embodiment 6.

FIG. 13 schematically illustrates a load management system 1 according to Embodiment 6. FIG. 14 is a block diagram conceptually illustrating image data 20 according to Embodiment 6. Descriptions of features the same as those in the above-described embodiments will be omitted.

The present embodiment assumes that a load to be managed is a cassette 18, and the medium processing apparatus 10 is configured to be capable of being loaded with the cassette 18.

The cassette 18 is a container for storing money (that is, coins or banknotes). The cassette 18 has a cassette identifier 19 allowing the cassette 18 to be recognized. The expression, "the cassette 18 is allowed to be recognized," means that the cassette 18 can be acknowledged while distinguished from other cassettes and other objects. The cassette identifier 19 is disposed on the outer surface of the cassette 18 so as to be visible from around the medium processing apparatus 10 in a state where the cassette is loaded in the medium processing apparatus 10. That is, the cassette identifier 19 is disposed on the outer surface of the cassette 18 such that the image of the cassette identifier can be captured.

The medium processing apparatus 10 is a money processing apparatus that processes money. The medium processing apparatus 10 is configured to receive money from the cassette 18 or to store money in the cassette 18.

The image-capturing apparatus 5 is used to capture an image of the cassette 18 loaded in the medium processing apparatus 10.

In the same manner as the judgment section 3 in each of the above-described embodiments, the judgment section 3 judges whether or not the image data 20 is authentic.

When the judgment section 3 judges that the image data 20 is authentic, the image analysis section 4 analyzes the analysis target image 21 to acquire information on the load, that is, the cassette 18. Specifically, based on the information embedded in the apparatus identifier 13 and the information embedded in the cassette identifier 19 successfully acquired from the analysis target image 21, the image analysis section 4 is capable of generating information indicating that the cassette 18 is loaded in the medium processing apparatus 10 at the time of judgment.

The cassette identifier 19 and the apparatus identifier 13 may be disposed respectively on the cassette 18 and the medium processing apparatus 10 so as to face in the same direction in a state where the cassette 18 is loaded in the medium processing apparatus 10. In this case, it is easy to perform image capturing by the image-capturing apparatus 5 such that the cassette identifier 19 and the apparatus identifier 13 are included in the analysis target image 21.

Embodiment 7

Figure 15:
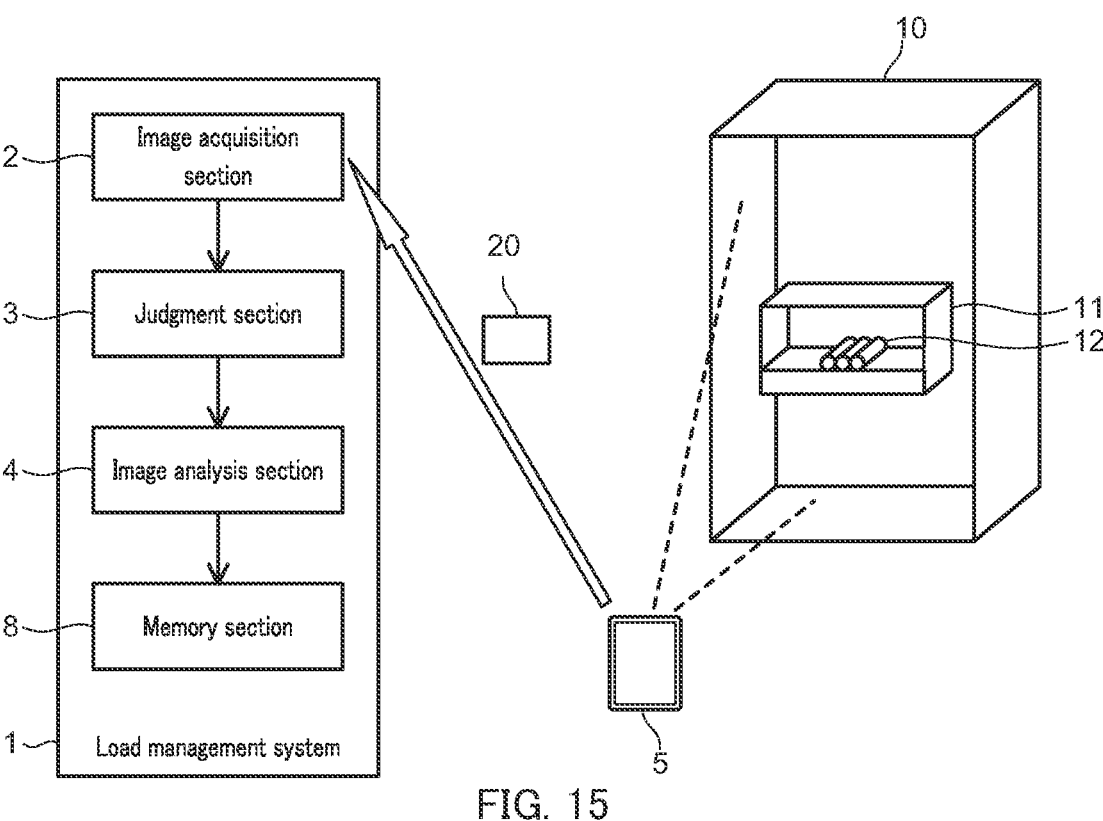
FIG. 15 schematically illustrates a load management system according to Embodiment 7.
Figure 16:
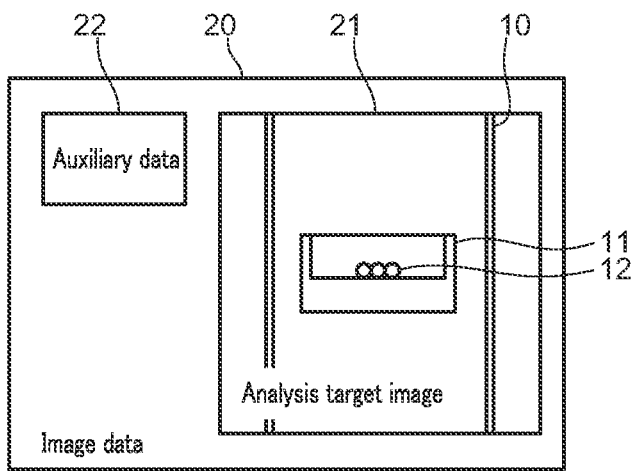
FIG. 16 is a block diagram of image data in Embodiment 7.

FIG. 15 schematically illustrates a load management system 1 according to Embodiment 7. FIG. 16 is a block diagram conceptually illustrating image data 20 according to Embodiment 6. Descriptions of features the same as those in the above-described embodiments will be omitted.

The load management system 1 according to the present embodiment comprises a memory section 8. The memory section 8 may be comprised of a storage apparatus such as a hard disk drive comprised by a computer in which one or more of the image acquisition section 2, the judgment section 3, and the image analysis section 4 are configured. Further, the memory section 8 may be comprised of a storage apparatus independent of the computer in which one or more of the image acquisition section 2, the judgment section 3, and the image analysis section 4 are configured.

The memory section 8 stores information on loads obtained as a result of the analysis by the image analysis section 4. Therefore, based on the information stored in the memory section 8, the load management system 1 is capable of appropriately managing the loads (for example, the coin rolls 12 or the cassette 18) loaded in the medium processing apparatus 10. For example, the load management system 1 is capable of accurately deriving the type and number of coin rolls remaining in the medium processing apparatus 10 after a coin roll 12 is dispensed from the medium processing apparatus 10. In addition, the load management system 1 is capable of accurately deriving when money is transferred from the cassette 18 to the medium processing apparatus 10 and from which cassette 18 money is transferred, or when money is transferred from the medium processing apparatus 10 to the cassette 18 and to which cassette 18 money is transferred.

In addition, when the judgment section 3 judges that the image data 20 is not authentic, the image analysis section 4 may generate, as temporary information, information on loads that is obtained by analyzing the analysis target image 21. In this case, the memory section 8 stores the temporary information in association with a flag indicating that the image data 20 is not authentic. With such a configuration, it is possible to treat the temporary information obtained from the non-authentic image data 20 by distinguishing it from information obtained from authentic image data 20. Therefore, it is possible to prevent the load management system 1 from managing the loads based on erroneous information. In addition, when the temporary information is stored, information relevant to the image-capturing apparatus 5 that has transmitted the image data 20 from which the temporary information is generated (for example, an ID or the like allowing the image-capturing apparatus 5 or a user of the image-capturing apparatus to be specified) may be read from the auxiliary data 22. Then, the memory section 8 may store the read information on the image-capturing apparatus 5 in association with the temporary information. In this case, it is possible to hear a cause of generation of the non-authentic image data 20 from the user of the image-capturing apparatus 5 to take measures.

In all of the embodiments described above, the load management system 1 may comprise the memory section 8, and the memory section 8 may store temporary information in association with a flag indicating that the image data 20 is not authentic.

It should be understood that the present disclosure is not limited to the embodiments described above, and various modifications may be made without departing from the spirit of the present disclosure. For example, any combination of the previously described embodiments is also included in the present disclosure. For example, Embodiment 4 or Embodiment 5 may assume the medium processing apparatus 10 comprising a plurality of stackers 11 as in Embodiment 3. In addition, the load management system 1 according to Embodiment 6 may comprise the token issuance section 6 or the communication section 7.

In addition, the load management system 1 is capable of managing not only the coin roll 12 and the cassette 18, but also various loads that can be loaded in the medium processing apparatus 10 and whose image can be captured by the image-capturing apparatus 5.

In addition, when the components of the load management system 1 are comprised of a single computer, this computer is a load management apparatus.

INDUSTRIAL APPLICABILITY

The present disclosure can be utilized as a system for managing a load to be loaded into a medium processing apparatus used in various industrial fields such as distribution, finance, or the like, or as a management apparatus having functions of such a management system.

REFERENCE SIGNS LIST

1 Load management system
2 Image acquisition section
3 Judgment section
4 Image analysis section
5 Image-capturing apparatus
6 Token issuance section
7 Communication section
8 Memory section
10 Medium processing apparatus
11 Stacker
12 Coin roll
13 Apparatus identifier 14 Cover
15 Hinge
16 Sensor
17 Door
18 Cassette
19 Cassette identifier
20 Image data
21 Analysis target image
22 Auxiliary data
23 Token

What is claimed is:

1. A load management system, comprising:
an image acquisition section configured to acquire image data including an analysis target image including a load loaded in a medium processing apparatus;
a judgment circuitry configured to judge whether or not the image data is authentic;
an image analysis circuitry configured to analyze the analysis target image to acquire information about the load when the image data is authentic; and
a communication circuitry configured to establish a communication session with an image-capturing apparatus through a wired connection or short-range wireless communication, the image-capturing apparatus being configured to capture the analysis target image, wherein
based on whether or not the image acquisition section has acquired the image data during the communication session established, the judgment circuitry judges whether or not the image data is authentic.

2. The load management system according to claim 1, wherein:
the medium processing apparatus has an apparatus identifier that allows the medium processing apparatus to be recognized and whose image is capable of being captured, and
based on identifier information acquired from the image of the apparatus identifier included in the analysis target image, the judgment circuitry judges whether or not the image data is authentic.

3. The load management system according to claim 1, wherein:
the image data is provided with a time stamp, and the time stamp is issued by a time stamp issuing server and certifies time at which the analysis target image is captured by an image-capturing apparatus, and
based on the time stamp, the judgment circuitry judges whether or not the image data is authentic.

4. The load management system according to claim 1, further comprising:
a coin roll processing apparatus as the medium processing apparatus, wherein:
the load is a coin roll, and
the information is information about a type and a number of the coin roll.

5. The load management system according to claim 1, further comprising:
a money processing apparatus as the medium processing apparatus, wherein:
the load is a cassette for storing money, and
the cassette has a cassette identifier that allows the cassette to be recognized and whose image is capable of being captured.

6. The load management system according to claim 1, further comprising:

a storage in which a coin roll as the load is stored, the storage being located at the medium processing apparatus;

an openable and closable transparent cover covering an opening in the storage; and an identifier displayed at a position where an image of the identifier is capable of being captured together with the coin roll stored in the storage and whose image is capable of being captured via the cover.

7. The load management system according to claim 6, further comprising:

a sensor configured to detect a change in an open or closed state of the cover.

8. A load management system, comprising:

control circuitry, wherein the control circuitry is configured to:

acquire image data including an analysis target image including a load loaded in a medium processing apparatus;

judge whether or not the image data is authentic;

when the image data is judged to be authentic, analyze the analysis target image to acquire information about the load; and establish a communication session with an image-capturing apparatus through a wired connection or short-range wireless communication, the image-capturing apparatus being configured to capture the analysis target image, wherein, based on whether or not the control circuitry has acquired the image data during the communication session established, the control circuitry judges whether or not the image data is authentic.

\* \* \* \* \*